United States Patent
Pouzadoux et al.

(10) Patent No.: US 9,695,695 B2
(45) Date of Patent: Jul. 4, 2017

(54) TURBOJET FAN BLADE

(71) Applicant: SNECMA, Paris (FR)

(72) Inventors: Frederic Pouzadoux, Melun (FR); Beatrice Nathalie Bois, Evry Gregy sur Yerres (FR); Jean-Michel Roux, Charenton le Pont (FR); Florent Till, Fontainebleau (FR)

(73) Assignee: SNECMA, Paris (FR)

( * ) Notice: Subject to any disclaimer, the term of this patent is extended or adjusted under 35 U.S.C. 154(b) by 376 days.

(21) Appl. No.: 14/375,308

(22) PCT Filed: Jan. 28, 2013

(86) PCT No.: PCT/FR2013/050168
§ 371 (c)(1),
(2) Date: Jul. 29, 2014

(87) PCT Pub. No.: WO2013/114030
PCT Pub. Date: Aug. 8, 2013

(65) Prior Publication Data
US 2015/0017012 A1    Jan. 15, 2015

(30) Foreign Application Priority Data
Jan. 30, 2012  (FR) ...................... 12 50838

(51) Int. Cl.
*F01D 5/14*  (2006.01)
*F04D 29/32*  (2006.01)

(52) U.S. Cl.
CPC ............. *F01D 5/147* (2013.01); *F01D 5/141* (2013.01); *F04D 29/324* (2013.01);
(Continued)

(58) Field of Classification Search
CPC ........ F01D 5/147; F01D 5/141; F04D 29/324; F05D 2240/304; F05D 2250/183;
(Continued)

(56) References Cited

U.S. PATENT DOCUMENTS 4,358,246 A * 11/1982 Hanson .................. B64C 11/16
                                                     415/119
5,642,985 A    7/1997 Spear et al.
(Continued)

FOREIGN PATENT DOCUMENTS

DE    198 12 624    9/1999
EP    0 801 230    10/1997
(Continued)

OTHER PUBLICATIONS

International Search Report Issued Jun. 7, 2013 in PCT/FR13/050168 filed Jan. 28, 2013.

*Primary Examiner* — Craig Kim
*Assistant Examiner* — Eldon Brockman
(74) *Attorney, Agent, or Firm* — Oblon, McClelland, Maier & Neustadt, L.L.P.

(57) ABSTRACT

A turbojet fan blade in which a leading edge presents a sweep angle greater than or equal to +28° in a portion of the blade that is situated at a radial height lying in a range of 60% to 90% of a total radial height of the blade measured from its root towards its tip, and the leading-edge sweep angle presents a difference of less than 10° between a minimum sweep angle measured at a radial height of minimum sweep angle situated in the portion of the blade lying in a range of 20% to 90% of the radial height of the blade, and a sweep angle measured at a radial height that is 10% greater than the radial height of minimum sweep angle.

5 Claims, 3 Drawing Sheets

(52) U.S. Cl.
CPC .... *F05D 2220/36* (2013.01); *F05D 2240/303* (2013.01); *F05D 2240/304* (2013.01); *F05D 2250/183* (2013.01); *F05D 2250/71* (2013.01); *Y02T 50/673* (2013.01)

(58) Field of Classification Search
CPC ............. F05D 2220/36; F05D 2250/71; F05D 2240/303; B64C 29/0033; B64C 11/00; B64C 11/001; B64C 11/18
See application file for complete search history.

(56) References Cited

U.S. PATENT DOCUMENTS

| | | | |
|---|---|---|---|
| 6,071,077 A * | 6/2000 | Rowlands | F01D 5/141 416/223 A |
| 6,338,609 B1 * | 1/2002 | Decker | F01D 5/141 415/173.1 |
| RE38,040 E | 3/2003 | Spear et al. | |
| 7,108,486 B2 * | 9/2006 | Talbotec | F01D 5/141 416/223 A |
| 7,476,086 B2 * | 1/2009 | Wadia | F01D 5/141 416/223 R |
| RE43,710 E | 10/2012 | Spear et al. | |
| 8,317,482 B2 * | 11/2012 | Bois | F01D 5/141 416/228 |
| 2001/0014285 A1 | 8/2001 | Schlechtriem | |
| 2004/0170502 A1 * | 9/2004 | Talbotec | F01D 5/141 416/223 R |
| 2008/0107538 A1 * | 5/2008 | Bois | F01D 5/141 416/223 A |
| 2008/0148564 A1 | 6/2008 | Burton et al. | |
| 2008/0181769 A1 | 7/2008 | Wilson et al. | |
| 2008/0286107 A1 | 11/2008 | Clemen | |

FOREIGN PATENT DOCUMENTS

| | | |
|---|---|---|
| EP | 1 921 324 | 5/2008 |
| EP | 1 953 341 | 8/2008 |
| EP | 1 985 802 | 10/2008 |
| EP | 2 278 124 | 1/2011 |

\* cited by examiner

TURBOJET FAN BLADE

BACKGROUND OF THE INVENTION

The present invention relates to the general field of blades for a turbojet fan. The invention relates more particularly to their shape.

The preparation of a turbojet fan blade needs to satisfy various multidisciplinary criteria. A fan blade is designed so as to optimize its efficiency and its thrust (in particular its flow rate capacities at high speed) while guaranteeing it has good mechanical strength, in particular at high speeds of rotation at which the mechanical stresses to which the blade is subjected are the most severe. The design of a fan blade must also comply with noise targets defined at various operating points described in current standards.

Numerous fan blade shapes have been proposed. They are generally characterized by a stacking relationship for the leading edges of their profiles and by the variation in the sweep angle of the leading edge in order to improve the aerodynamic performance of the blade and in order to reduce the noise generated by the fan. By way of example, mention may be made of publication EP 1 452 741, which describes a particular swept blade shape for a turbojet fan or compressor.

OBJECT AND SUMMARY OF THE INVENTION

An object of the present invention is to propose a fan blade shape achieving considerable aerodynamic improvement compared with the state of the art, in particular in terms of specific flow rate, and also mechanically and acoustically.

In accordance with the invention, this object is achieved by a turbojet fan blade having a root, a tip, a leading edge, and a trailing edge, wherein the leading edge presents a sweep angle greater than or equal to +28° in a portion of the blade that is situated at a radial height lying in the range 60% to 90% of the total radial height of the blade measured from its root towards its tip, and the leading-edge sweep angle presents a difference of less than 10° between a minimum sweep angle measured at a radial height of minimum sweep angle situated in the portion of the blade lying in the range 20% to 90% of the radial height of the blade, and a sweep angle measured at a radial height that is 10% greater than said radial height of minimum sweep angle.

A value of at least +28° for the sweep-back of the leading edge enables the blade to achieve a maximum specific flow rate greater than 210 kilograms per second per square meter ($kg/s/m^2$) with sufficient operability for the engine, i.e. limiting the increase in the angle of attack of the profiles without having recourse to variable devices (adjustable pitch, nozzle, ... ). Its location at more than 60% of the total radial height of the blade is imposed by the need to accommodate the stresses and the acoustic constraints to which the blade is subjected. The mechanical equilibrium desired for reducing stresses in nominal operation (lifetime of the blade zone under the hub passage, long-lasting contact interfaces between the blade and the disk) and also under extreme conditions (ability to withstand ingesting heavy birds, high levels of vibration), plus operability constraints that prevent the chord being reduced too much at the tip, put a limit on the possible amplitude of oscillations of the center of gravity over the height of the blade, and even more over the bottom 50% where stresses are mainly located.

Locating this sweep-back of the leading edge at a radial height of less than 90% of the total radial height of the blade serves to avoid having excessive sweep-back at the tip sections (i.e. the sections close to the casing surrounding the fan) relative to lower sections so as to ensure aeromechanical stability for the blade.

Furthermore, the limit of 10° for the leading-edge sweep angle difference between the radial height of minimum sweep angle situated in the portion of the blade lying in the range 20% to 90% of the radial height of the blade and a sweep angle measured at a radial height that is 10% greater than the radial height of minimum sweep angle serves to improve the acoustic signature of the blade by significantly reducing the propagation of turbulence in its wake for operating points at less than full thrust. Thus, only the performance (in terms of flow rate, efficiency, and sound) of the secondary stream is taken into account (where the secondary stream typically lies in the range 20% to 100% of the radial height of the blade).

This results in a blade having aerodynamic performance that is improved, while remaining robust from mechanical and acoustic points of view.

The leading edge may present a negative sweep angle (i.e. a forward sweep) in a low portion of the blade situated in the range 0% to 50%. Under such circumstances, the leading-edge sweep angle difference is preferably less than 10° between a sweep-back changeover radial height that corresponds to a point of the leading edge where the sweep changes to sweep-back and that is situated directly above the height of minimum sweep angle and a sweep angle measured at a radial height that is 10% greater than the sweep-back changeover radial height.

In an advantageous provision, the difference between the maximum longitudinal abscissa value of the center of gravity of blade sections situated above a minimum longitudinal abscissa point and the longitudinal abscissa value of the center of gravity of the blade section corresponding to the minimum longitudinal abscissa point is less than or equal to 20% of the axial chord of the blade measured at its root. An advantage of such a provision is to limit the moment of the blade and to balance it, in particular so as to limit the bending moments of the airfoil on the root of the blade.

The invention also provides a turbojet fan and a turbojet including a plurality of blades as defined above.

BRIEF DESCRIPTION OF THE DRAWINGS

Other characteristics and advantages of the present invention appear from the following description made with reference to the accompanying drawings, which show an embodiment having no limiting character. In the figures.

DETAILED DESCRIPTION OF THE INVENTION

Figure 1:
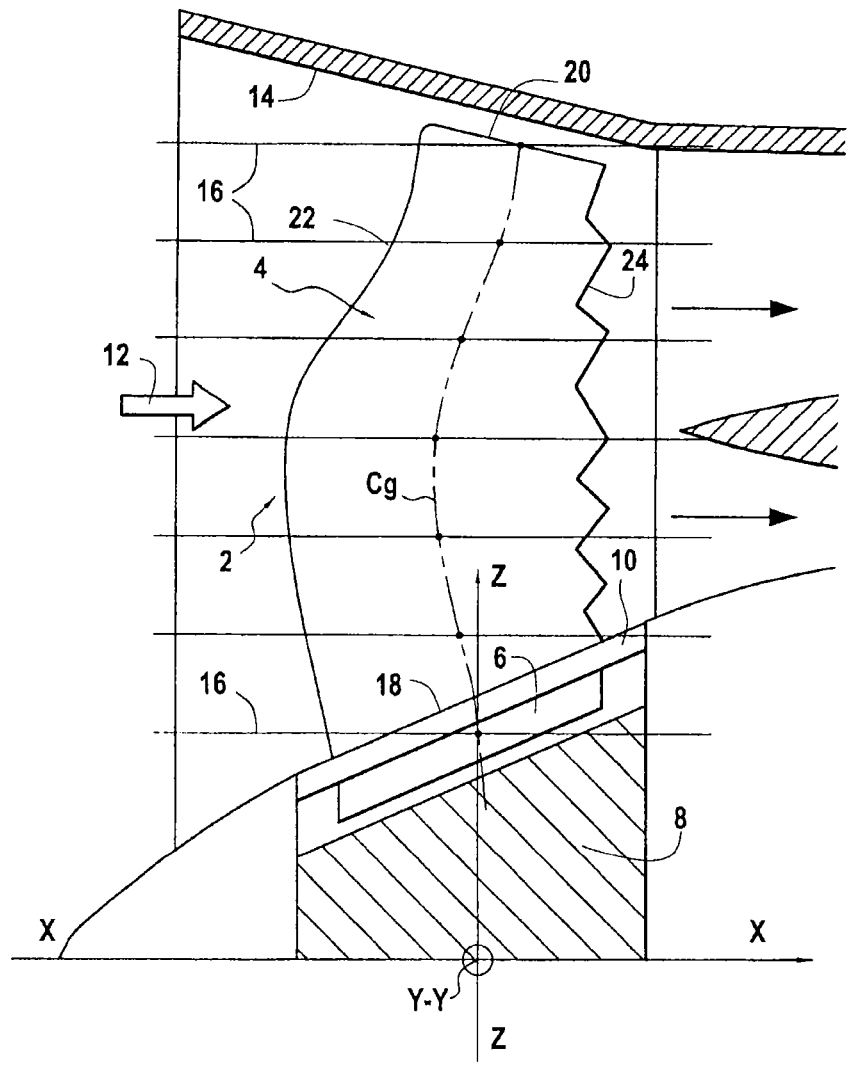
FIG. 1 is a fragmentary view in longitudinal section of a turbojet fan having blades of the invention.

The invention applies to any turbojet fan blade, such as the blade shown in FIG. 1. This figure shows a fragment of a turbojet fan 2 having a plurality of blades 4 of the invention that are regularly spaced apart from one another around the longitudinal axis X-X of the turbojet, the axis X-X being oriented in the direction of the air stream passing through the fan.

Each blade 4 is fastened by a root 6 to a disk (or hub) 8 that is driven in rotation about the longitudinal axis X-X of the turbojet in the direction of arrow F. Each blade may also have a platform 10 that forms a portion of the inner wall defining the inside of the flow passage for the stream of cold air 12 passing through the fan. A wall 14 of a casing surrounding the fan forms the outer wall that defines the outside of the same flow passage.

In the description below, for each blade 4, a radial axis Z-Z is defined as being perpendicular to the longitudinal axis X-X and passing through the center of gravity of the section where the blade intersects the inner wall of the flow passage for the cold air stream. A tangential axis Y-Y (not shown in the figures) forms a right-handed rectangular reference frame together with the axes X-X and Z-Z.

As shown in FIG. 1, each blade 4 has a plurality of blade sections 16 defined where the blade intersects planes perpendicular to the radial axis Z-Z and with centers of gravity that stack along a line of the centers of gravity $C_g$.

Each blade 4 is also radially defined between a root 18 and a tip 20, and longitudinally defined between a leading edge 22 and a trailing edge 24. The blade is also twisted from its root 18 to its tip 20 in order to compress the cold air stream 12 passing through the fan while it is in operation.

In the description below, the minimum radial height of the blade equal to 0% is defined as corresponding to the point of intersection of the leading edge of the blade with the inner wall defining the inside of the flow passage for the cold air stream, and the maximum radial height of the blade, equal to 100%, is defined as corresponding to the point where the leading edge line is radially furthest from the axis.

According to the invention, the leading edge of the blade presents a sweep angle greater than or equal to +28° in a portion of the blade situated at a radial height lying in the range 60% to 90% of the total radial height of the blade as measured from its root towards its tip.

Figure 2:
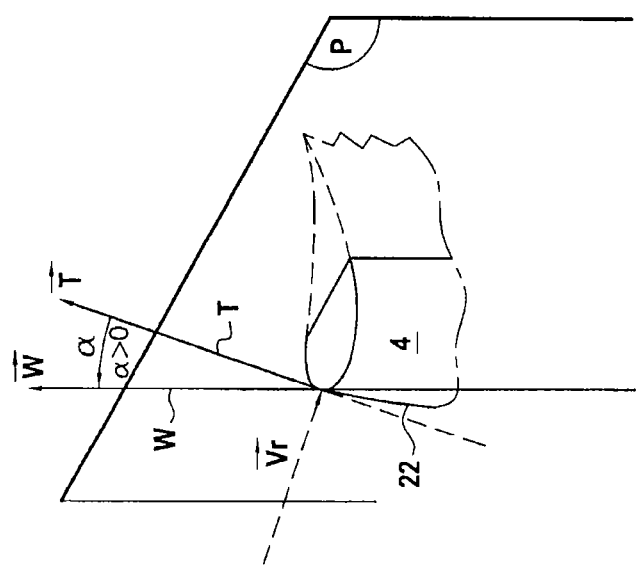
FIG. 2 is a diagram showing how the sweep angle is defined.

As shown in FIG. 2, the sweep angle means the angle α formed at a point on the leading edge 22 of the blade 4 between the tangent T to the leading edge and the line W perpendicular to the relative speed vector $\vec{V}_r$, this line W lying in the plane P that contains both the tangent T and the relative speed vector $\vec{V}_r$. This angle is measured in the plane P. When the angle α formed between the vector $\vec{T}$ (tangent oriented towards increasing radius) and the vector $\vec{W}$ towards increasing radius) is positive (as shown in FIG. 2), the leading edge is said to be swept back. Conversely, when the angle α is negative, it is said that the leading edge is swept forwards.

This definition complies with and is identical to that given more precisely in the publication by Leroy H. Smith and Hsuan Yeh entitled "Sweep and dihedral effects in axial-flow turbomachinery" (published in the Journal of Basic Engineering in September 1963—p. 401). All of the values given in the present application are calculated in compliance with the formulae shown in detail in that publication.

Figure 3:
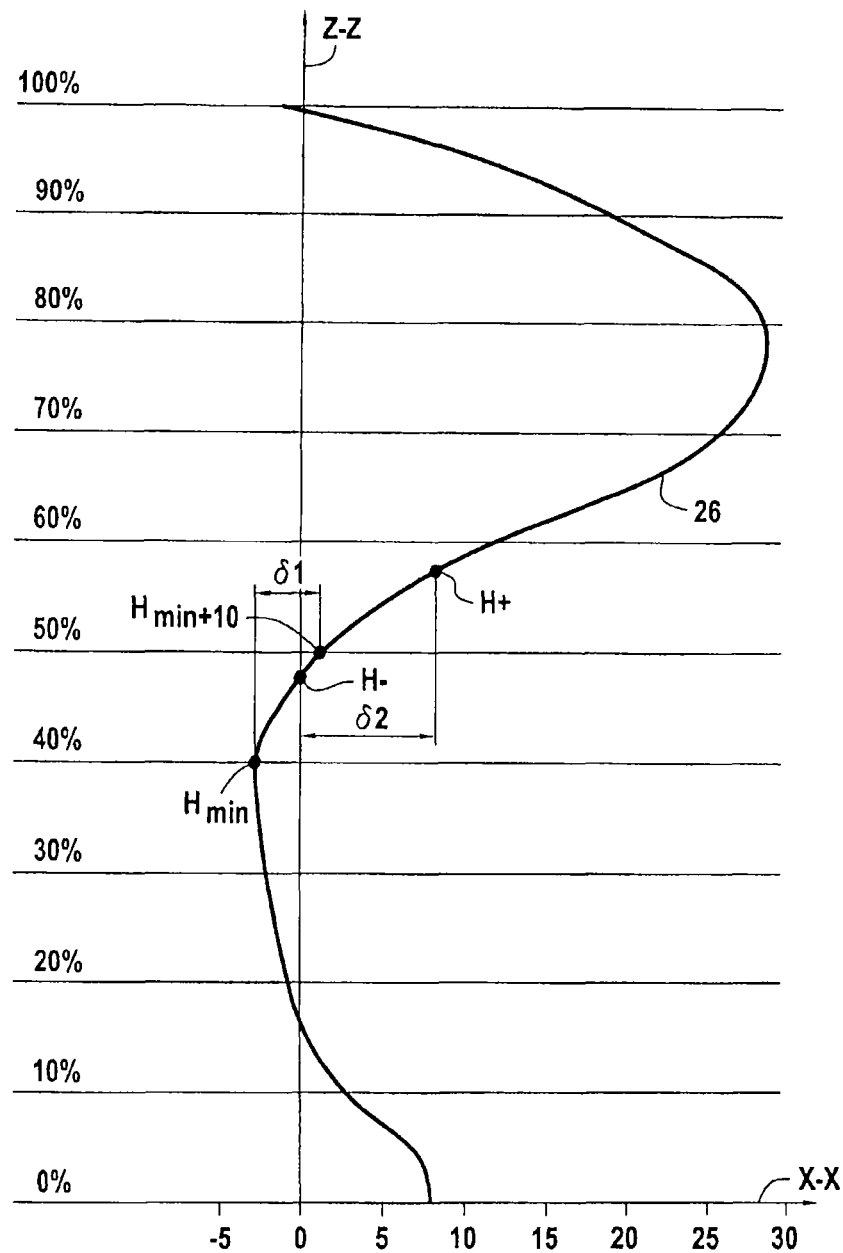
FIG. 3 shows the profile of the sweep angle of the leading edge of a blade in accordance with the invention.

The line 26 shown in FIG. 3 gives an example of how the sweep angle of the leading edge of a blade in accordance with the invention varies as a function of radial height along the blade.

In this embodiment, the leading edge of the blade is swept back (i.e. it has a positive sweep angle) with a value close to +30° for radial height in the range 70% to 80%.

Still in the invention, the difference δ1 in the sweep angle of the leading edge is less than 10° (in absolute value) between the sweep angle at a radial height $H_{min}$ of minimum sweep angle that corresponds to a minimum of the sweep angle and that is situated in the portion of the blade extending between 20% and 90% of the radial height of the blade, and a sweep angle measured at a radial height $H_{min+10}$ that is 10% greater than the radial height of minimum sweep angle.

The term "radial height $H_{min}$ minimum sweep angle>> is used herein to mean the radial height of the leading edge of the blade at which the value of the sweep angle is the smallest. In the embodiment of FIG. 3, this radial height $H_{min}$ of minimum sweep angle is situated at about 40% of the total radial height of the blade (the sweep angle of −3° at that point is the minimum sweep angle over the entire portion of the blade extending between 20% and 90%).

Still in the embodiment of FIG. 3, the difference δ1 in sweep angle is, in absolute value, approximately 5° (sweep angle at $H_{min}$: −3°, sweep angle at $H_{min+10}$: +2°).

The leading edge of the blade may also present a forward sweep (i.e. a negative sweep angle) in a low portion of the blade lying in the range 0% to 50%. In the embodiment of FIG. 3, the sweep angle of the leading edge is thus negative for radial heights lying in the range 15% to 45%. More precisely, the sweep angle is initially positive between the minimum radial height of the blade (0%) and a radial height of about 15%, it then becomes negative up to a radial height of 45%, and becomes positive again from that point.

Under such circumstances, the sweep angle difference δ2 of the leading edge between a sweep-back changeover radial height H− that corresponds to a point of the leading edge where the sweep changes to sweep-back and that is situated directly above the height $H_{min}$ of minimum sweep angle, and a sweep angle measured at radial height H+ that is 10% greater than the sweep-back changeover radial height is less than 10° (in absolute value).

The term "sweep-back changeover radial height H−" is used herein to mean the radial height of the leading edge of the blade at which the sweep angle changes from a negative value to a positive value. In the embodiment of FIG. 3, this sweep-back changeover radial height H− is situated at about 45% of the total radial height of the blade.

Still in the embodiment of FIG. 3, the sweep angle difference δ2 has an absolute value of about 7° (sweep angle value at H−: 0°; sweep angle value at the radial height H+ measured at 10% above H−: +7°.

Figure 4:
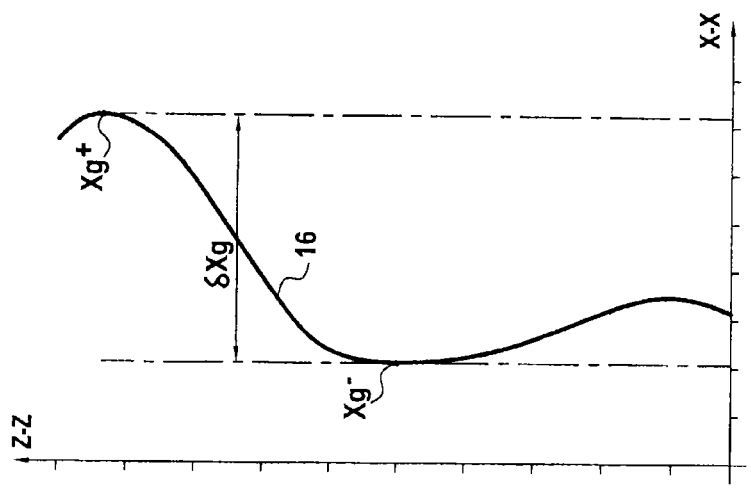
FIG. 4 is a projection onto a meridian plane of the line through the centers of gravity of the sections of a blade in accordance with the invention.

FIG. 4 shows the projection onto a meridian plane of the line of the centers of gravity of the sections of a blade in accordance with the invention. This line connects together the longitudinal abscissa values of the centers of gravity of each of the sections of the blade.

In an advantageous arrangement of the invention shown in FIG. 4, the difference $\delta X_g$ along the drive axis X-X oriented in the air stream direction, between the maximum longitudinal abscissa value of the center of gravity $X_g^+$ of the blade sections situated above a minimum longitudinal abscissa point and the longitudinal abscissa value of the center of gravity $X_g^-$ of the blade section corresponding to the minimum longitudinal abscissa point is less than or equal (in absolute value) to 20% of the axial chord of the blade measured at its root section that is defined by the intersection between the blade and the inner wall of the passage.

The "chord" of the blade is used to mean the straight line connecting together the points of the leading edge to the points of the trailing edge. The axial projection of this chord along the drive axis X-X is the axial chord.

The value of the axial chord of the blade measured at its root depends on the size of the engine. By way of example, it might be about 300 millimeters (mm). Under such circumstances, the difference may for example be about 45 mm, which is much less than 20% of the axial chord of the blade measured at its root.

The invention claimed is:

1. A turbojet fan blade comprising:
   a root;
   a tip;
   a leading edge; and
   a trailing edge,
   wherein the leading edge presents a sweep angle greater than or equal to +28° in a portion of the blade that is situated at a radial height lying in a range of 60% to 90% of a total radial height of the blade measured from the root towards the tip,
   wherein the leading edge sweep angle presents a minimum situated at a minimum sweep angle radial height of the blade, the minimum sweep angle radial height being situated in a portion of the blade lying in a range of 20% to 90% of the total radial height of the blade,
   wherein the leading edge presents a first sweep angle difference corresponding to a difference in absolute value between a sweep angle measured at the minimum sweep angle radial height and a sweep angle measured at a radial height that is 10% greater than the minimum sweep angle radial height, the first sweep angle difference being less than 10°, and
   wherein the leading edge sweep angle is positive in a portion of the blade that is situated at a radial height lying in a range of 0% to 15% of the total radial height of the blade.

2. A blade according to claim 1, wherein the leading edge presents a negative sweep angle in a low portion of the blade situated in a range of 0% to 50%,
   wherein the leading edge sweep angle changes to sweep-back at a sweep-back changeover radial height of the blade, the sweep-back changeover radial height being situated directly above the minimum sweep angle radial height,
   wherein the leading edge presents a second sweep angle difference corresponding to a difference in absolute value between a sweep angle measured at the sweep-back changeover radial height and a sweep angle measured at a radial height that is 10% greater than the sweep-back changeover radial height, the second sweep angle difference being less than 10°.

3. A blade according to claim 1, wherein a difference between a maximum longitudinal abscissa value of a center of gravity of blade sections situated above a minimum longitudinal abscissa point and a longitudinal abscissa value of the center of gravity of the blade section corresponding to the minimum longitudinal abscissa point is less than or equal to 20% of an axial chord of the blade measured at the root.

4. A turbojet fan, comprising a plurality of blades according to claim 1.

5. A turbojet, comprising a plurality of blades according to claim 1.

* * * * *